March 25, 1969     J. F. RUETH ET AL     3,434,300

AIR CONDITIONING VAPORIZER

Filed Oct. 27, 1967     Sheet 1 of 2

INVENTORS
JOSEPH F. RUETH
CHARLES A. URIAN
BY William R. Nolte
AGENT

United States Patent Office 3,434,300
Patented Mar. 25, 1969

3,434,300
AIR CONDITIONING VAPORIZER
Joseph F. Rueth, Warminster, and Charles A. Urian, Abington, Pa., assignors to The Budd Company, Philadelphia, Pa., a corporation of Pennsylvania
Filed Oct. 27, 1967, Ser. No. 678,606
Int. Cl. F29d 17/04; B60h 3/04; F24f 3/16
U.S. Cl. 62—309                                4 Claims

ABSTRACT OF THE DISCLOSURE

Railway vehicle ceiling mounted air conditioning unit with tank containing vaporizer fluid on supply side of unit for freshening air which has been returned from the interior of the vehicle, and including a housing with cradle means for supporting the vaporizer tank.

---

The present invention relates in general to improved air conditioning systems for use in passenger transportation vehicles, such as railway, motor, or aircraft vehicles, and more particularly, to an improved air conditioning system employing air conditioning means having ducting means for conveying the conditioned air supplied therefrom to the interior of the vehicle with fluid vaporizer apparatus installed, in the ducting means.

One type of air conditioning system which has previously been used in passenger transportation vehicles has incorporated a fluid vaporizer device on the return air or inlet side of an air conditioning unit. The fluid of the vaporizer upon conversion to vapor is mixed with the stale air which has been returned from the interior of the vehicle and is drawn into the inlet side of an air conditioner unit. Such units normally include an evaporator, heater, coil and blower. It has been found disadvantageous to place the vaporizer on the inlet side of an air conditioning unit in that the effectiveness of the vaporized fluid is dissipated as a result of the vaporized air being drawn into the evaporator, heater and blower components. Moreover it has been found in such installations that the placement of the vaporizer unit has usually been in high inaccessible locations requiring difficult assembly and service procedures.

Accordingly, it is the principal object of this invention to provide an air conditioning system employing a fluid vaporizer device which avoids one or more of the disadvantages of the prior art arrangements and which has an improved efficiency.

It is a further important object of this invention to provide an improved air conditioning system for a passenger vehicle in which a fluid vaporizer is employed in conjunction with an air conditioning unit on the supply or conditioned air side of the unit.

It is a further object of this invention to provide an improved air conditioning system for a passenger vehicle in which a fluid vaporizer unit is placed within ducting which conveys air which has been conditioned to the interior of the vehicle and wherein access to said ducting for installation and replenishment of fluid is readily available by an operator from the interior of said vehicle.

In accordance with the invention, an air conditioning system includes an air conditioning unit installed between the roof and ceiling structure of a vehicle. The unit is effective to condition stale air which has been removed from the car interior and to convey the conditioned air back to the interior of the car by suitable ducting. In order to further improve the air conditioned, fluid vaporizer means are provided to emit vapors to combine with and remove odors from the air which has been conditioned. The vaporizer means include tank means for containing a fluid to be vaporized. The ceiling of the vehicle is provided with an opening to enable the tank to be passed into the ducting. The tank means include housing means encircling the opening and cradle means to support the tank containing fluid to be vaporized. Door means are provided in the ceiling to cover said opening and to conceal the vaporized means from view interiorly of the vehicle.

For a better understanding of the present invention together with other and further objects thereof, reference is had to the following description taken in connection with the accompanying drawings and its scope will be pointed out in the appended claims.

Figure 1:
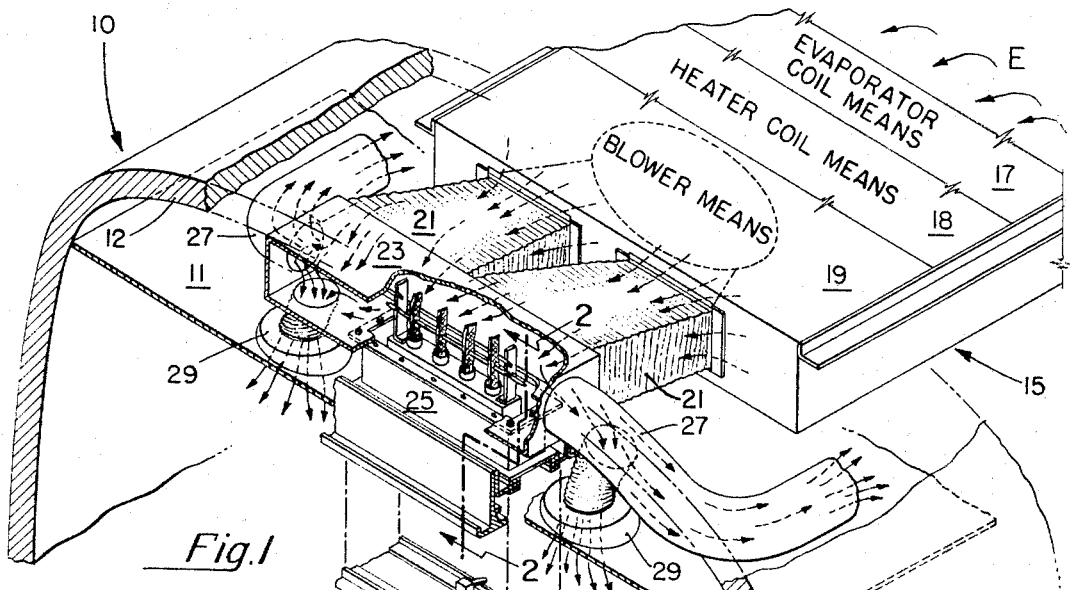
FIG. 1 is a diagrammatic perspective view of a vehicle, with parts broken away and other parts omitted and which is provided with the air conditioning system of the present invention.

Referring to FIG. 1 in the drawing, there is shown a portion of a railway passenger vehicle 10, partially schematic, with an air-conditioning system installed between its ceiling 11 and roof portion 12. The air conditioning system comprises an air conditioning unit 15 which conditions air which has been returned from the interior 16 of the car. As indicated by the arrow E, the air is drawn into and through evaporator coil means 17, heater coil means 18, and blower means 19. The air so conditioned leaves the unit by a pair of side-by-side ducts 21 connected at one of their ends to the unit 15 and at ttheir other ends to a rectangular hood 23. The hood is mounted above the vaporizer means 25 of the present invention in a manner to pass the air supplied by the air conditioner over the vaporizer means. Vapors are emitted by the vaporizer and are caused to combine with the conditioned air to remove odors from it. Tubular ducts connected to the opposite ends of the hood and to opposite sides of the interior of the car conduct the air which has been so freshened to the interior of the car. Air diffuser units 29 mounted in the ceiling and connected to the ends of the ducts serve to smoothly distribute the air within the interior of the car.

Figures 2, 5:
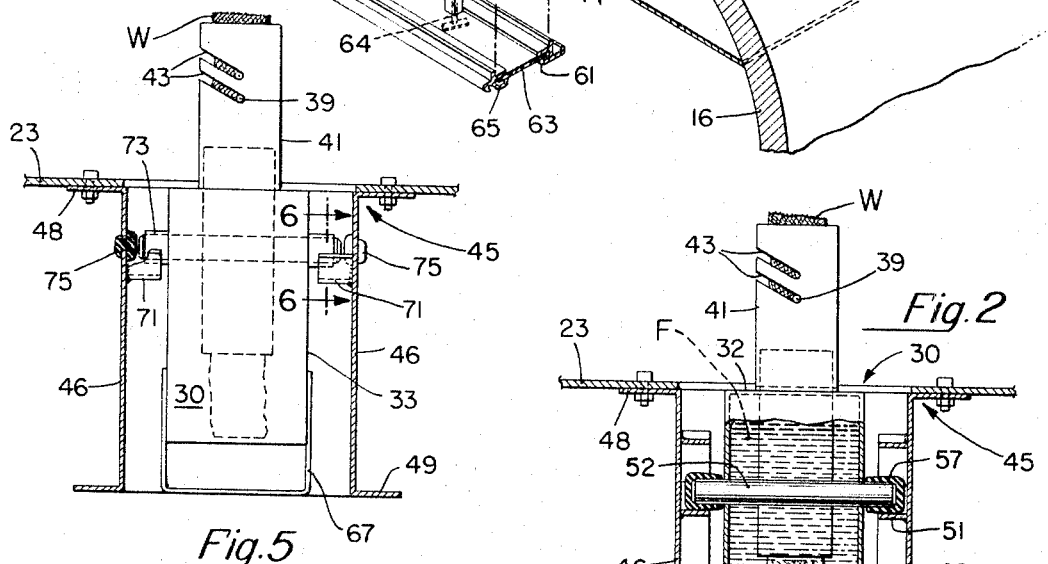
FIG. 2 is an enlarged sectional view of a part of the vaporizer apparatus of the vehicle taken along the line 2—2 of FIG. 1.
FIG. 5 is a cross-sectional view similar to that shown in FIG. 2 of an alternative form arrangement for securing a vaporizer tank assembly within a housing.
Figure 3:
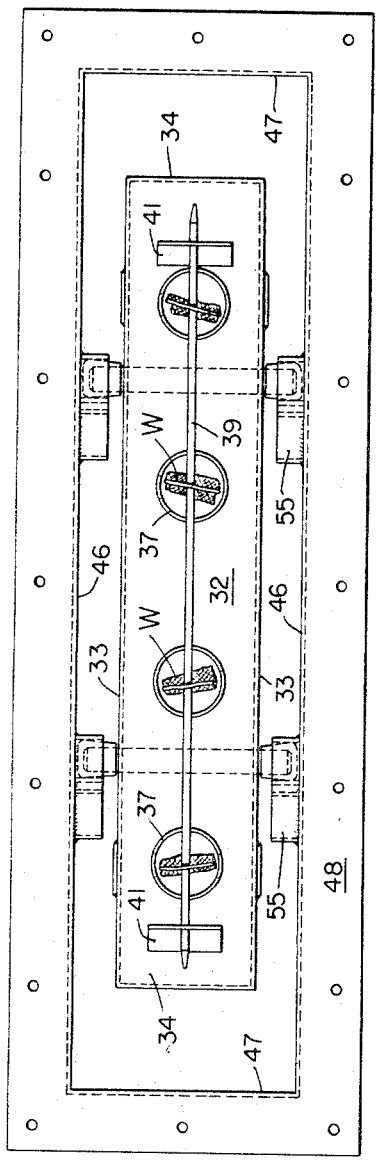
FIG. 3 is a plan view of the vaporizer tank assembly containing the vaporizer fluid shown in FIG. 2.
Figure 4:
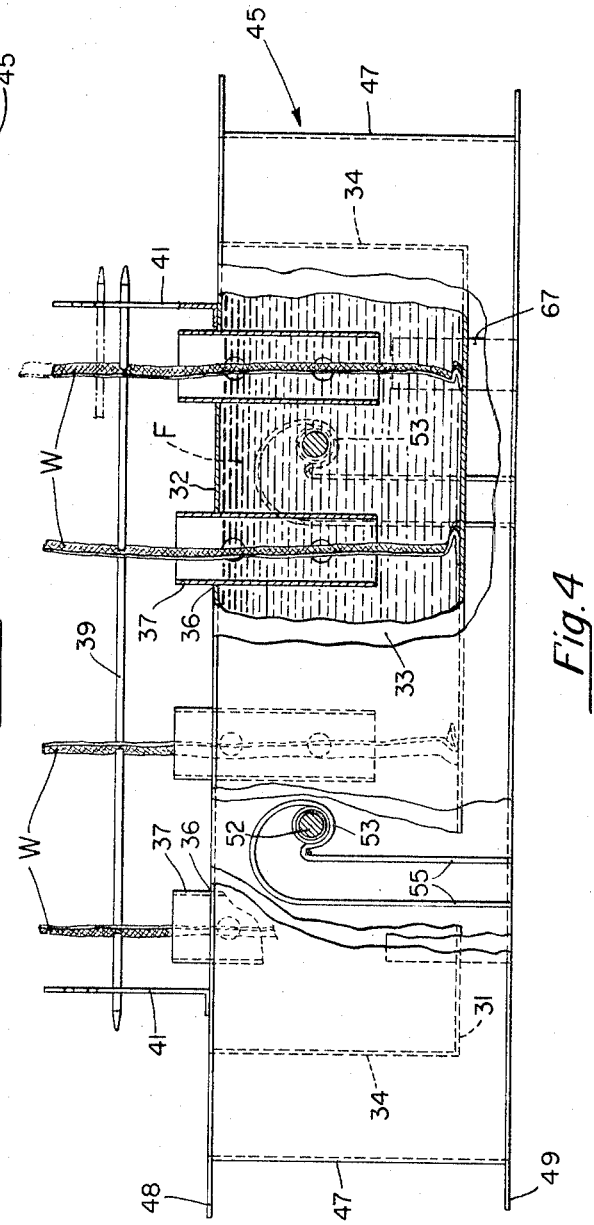
FIG. 4 is a side elevational view, partially broken away, of the apparatus shown in FIG. 3.

With reference now to FIGS. 2, 3 and 4, the vaporizer tank assembly 25 is shown as comprising a generally enclosed reservoir or tank 30 for containing a fluid F which upon vaporization will mix with and remove odors from the circulating air supplied from the air conditioning unit 15. The tank includes a rectangular bottom 31, a like dimensioned top 32, elongated side walls 33 and opposite end walls 34. The top wall includes a plurality of openings 36 of which admits a cylindrical chimney 37 and which in turn encircles and guides a wick element W into its fluid F. The upper ends of the wicks are supported above each of the chimneys to enable dispersion of vapors therefrom and are pierced by a horizontally disposed rod 39 which is supported at its opposite ends by means of suitable upstanding bracket members 41. The latter brackets are affixed to the outer surface of top plate 32 and include a plurality of inclined slots 43 to receive the ends of rod 39.

The tank 31 is encircled by a housing 45 having side walls 33 and 34 respectively of tank 31. The housing in wall 46 and end walls 47 uniformly spaced from side addition includes a top flange 48 suitably affixed to the hood member 23, see FIG. 1, and a lower flange 49 which rests upon the inside of top side of the ceiling structure 11, see FIG. 2. In order to position and support the tank 30 to the housing 45, novel support means 51 are provided to extend between the tank and housing. As seen in FIGS. 2–4 inclusive, tank 30 includes a pair of rods 52 extending through the tank so that end portions there project beyond the side walls 33 of the tank to stop just short of the side walls 46 of housing 45. The housing in turn includes cradle means 53 in the form of U-shaped curved strips which are secured to the inner surfaces of side wall plates 46 of the housing and project outwardly from the sides of the tank.

In order to guide the movement of the tank into and out of the housing, guide means 55 consisting of spaced apart strips of material are likewise affixed in projecting relation from the plates 46. The guide strips 55 extend vertically in parallel relation to each other and bow over at their top portions to merge with the U-shaped cradle members. Thus, during either the installation step or the removal step of the tank from its housing, the free ends of rods 52 are caused to ride in the guideway formed by the strips 55. Further, in order to prevent rattling between the ends of rods and the cradle 51, resilient bumper means, in the form of elastomer cap members 57, are provided to encircle the ends of the rods. It is thus seen that arrangements used in securing the tank to the housing is simple, self-centering and rattleproof. As particularly observed in FIG. 2, the length of the rods 52 with cap elements over their ends is slightly less than the distance between the inside surfaces of opposed plates 46 of the housing. It is thus seen that fore and aft motion of the tank is limited by the plates 46 while its movement thereof in a transverse direction is inhibited by the aforementioned cradle elements 51.

With further reference to FIG. 2, it is noted that the ceiling 11 includes an opening 61 which is normally covered by a removable hinged door 63, which may be locked in position by means of a lock 64. The door is received in frame structure 65 which encircles the margins of the opening 61. Thus, upon unlocking the lock 64 and upon removal of the door 63 from the opening, an operator may either install or remove the tank vaporizer 30 from its housing by grasping U-shaped handle elements 67 secured to the lower surface of the tank.

Figure 6:
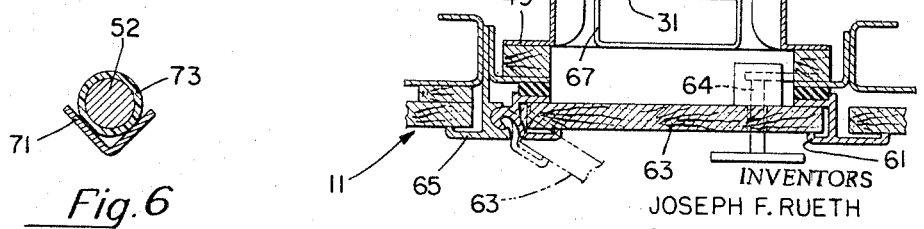
FIG. 6 is a sectional view taken along the line 6—6 of FIG. 5.

With reference now to FIGS. 5 and 6 an alternate form of the invention is shown in which cradle members in the form of short angle members 71 are secured in projecting inward relationship to the inside wall surfaces of plates 46 of housing 45. The arms of the angle members are upturned to receive the ends of the cross-bars 52 which include resilient rings 73 encircling their outer ends. In addition resilient grommet members 75 are received in the plates 46. The grommets are positioned opposite the trough formed by the upturned arms of the angle members and serve to snub or inhibit lateral play of the tank 30.

While there have been described what are at present considered to be the preferred embodiments of this invention it will be obvious to those skilled in the art that various changes and modifications may be made therein without departing from the invention, and it is therefore, aimed in the appended claims to cover all such changes and modifications as fall within the true spirit and scope of the invention.

We claim:

1. In an air conditioning system for a railway vehicle and the like having an interior for passengers and a ceiling and roof thereabove, an air conditioning unit having a supply side mounted between said ceiling and said roof for emitting from said supply side air which has been conditioned, means for ducting said conditioned air from said supply side to the interior of said vehicle, air freshening vaporizer means received within said ducting means for emitting vapors to combine with the conditioned air from said air conditioning unit, said vaporizer means including tank means for containing a fluid to be vaporized, housing means extending above said ceiling means, cradle means extending from said housing means to support said tank means, track means extending from said housing, and bar means extending from said tank means for reception into said track means, said track means serving to guide said bar means for movement into engagement with said cradle means.

2. In the air conditioning system as set forth in claim 1, wherein said housing means includes wall portions, and wherein said bar means extends outwardly from said tank means along axes normal to said wall portions, said latter wall portions serving to limit travel of said tank means along said axes.

3. In the air conditioning system as set forth in claim 2, wherein said bar means include resilient means for coacting with said cradle means and said wall portions, to thereby minimize the generation of vibration and noise therebetween.

4. In the air conditioning system as set forth in claim 3, wherein said ceiling includes an open end, and wherein said housing coincides with the margins of said opening to enable movement of said tank means through said opening to enable entry of said bar means into said track means for travel therealong.

References Cited

UNITED STATES PATENTS

| 2,082,957 | 6/1937 | Hamilton | 62—309 |
| 2,248,713 | 7/1941 | Locke | 62—78 |
| 2,319,130 | 5/1943 | Hanson | 62—309 |

WILLIAM J. WYE, *Primary Examiner.*

U.S. Cl. X.R.

62—78, 91, 239